United States Patent Office 3,687,734
Patented Aug. 29, 1972

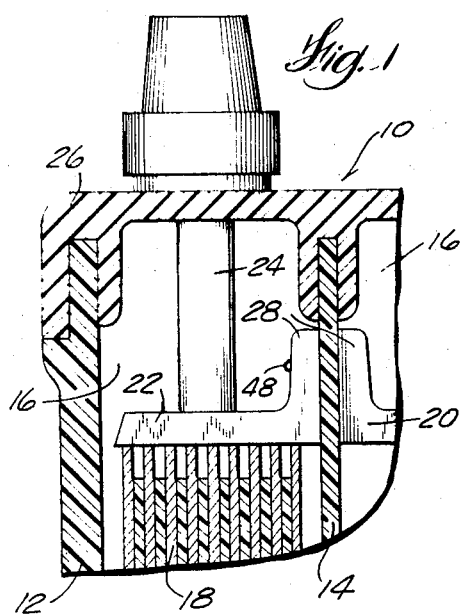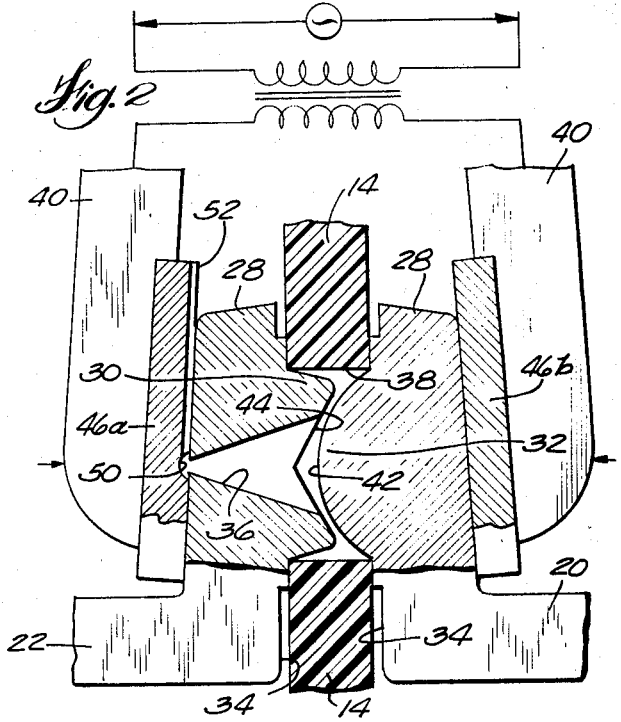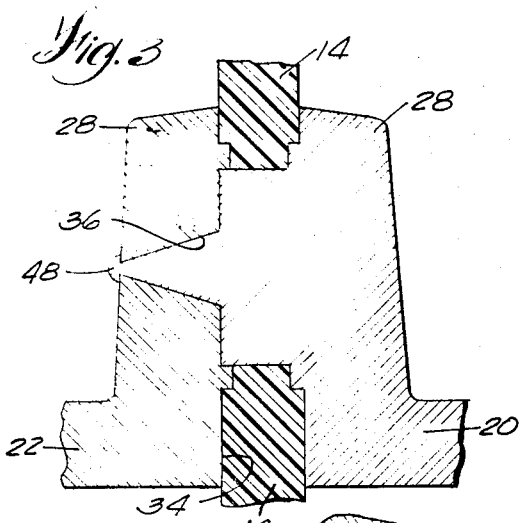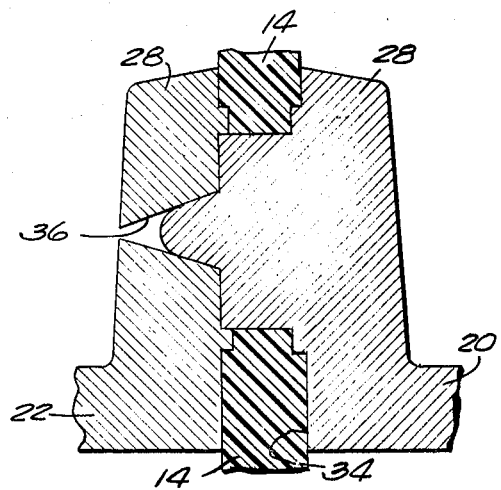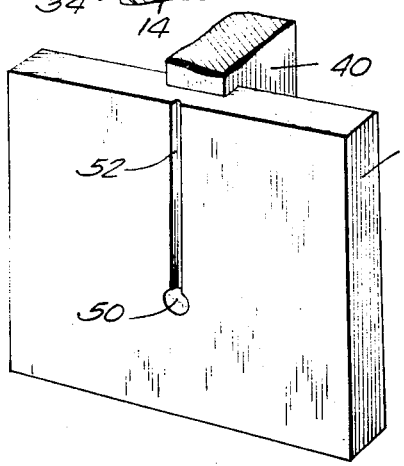

3,687,734
STORAGE BATTERY ELECTRICAL CONNECTORS
Daniel Orlando, Brookfield, and George Paul Smith, Milwaukee, Wis., assignors to Globe-Union Inc., Milwaukee, Wis.
Filed Aug. 26, 1970, Ser. No. 67,036
Int. Cl. H01m 5/00
U.S. Cl. 136—134 R    15 Claims

ABSTRACT OF THE DISCLOSURE

A connector for electrically connecting two elements of a storage battery through an aperture in a partition or the element in an end cell compartment to an external terminal through an aperture in an outer wall of the battery casing by the heat fusion technique wherein at least one of the connector lugs is provided with a passage extending horizontally therethrough. Molten material from an internal portion of the connector is extruded through this passage during the heat fusing step and the formation of a small protuberance of this material on the outer surface of the connector lug indicates that the completed connection is not formed by a "cold weld."

BACKGROUND OF THE INVENTION

Field of the invention

This invention relates to storage batteries and, more particularly, to electrical connectors for multicell storage batteries and a method for making same.

Description of the prior art

Several types of constructions are known for electrically and mechanically connecting assembled cell groups in adjoining cells of a multicell storage battery utilizing through-partition connectors to obtain a fluid tight seal at the cell partition. In one type, the connector lugs, electrically connected to battery elements in adjoining cells, are fused together through an aperture in the partition by resistance welding while the connector lugs are under the application of a squeezing force. The intercell connections so produced provides a superior seal against the leakage of electrolyte between the cells because it is in sealing engagement when both the walls of the aperture and the opposite sides of the partition. The construction and method for providing such an intercell connection is fully disclosed in U.S. Pat. 3,313,658, assigned to the assignee of the present applicants. Similar constructions are utilized for making connections between the elements in the end cells to external terminals through an outside wall of the battery casings, such as that disclosed in U.S. Pat. 3,303,056.

Connectors of this type require a reasonably high degree of fusion between the two lugs in order to obtain a reliable and durable connection capable of withstanding the electrical and mechanical loads imposed thereon during normal battery operation. The degree of fusion is governed primarily by the amount of heat produced during the welding step. If the heat energy produced is too low, poor fusion between the lugs and a "cold weld" results. A connection provided by a "cold weld" has a high internal electrical resistance thereby reducing the available energy output of the battery. Also, a "cold weld" connection tends to break when subjected to sustained high current loads, such as during the starting of a "balky" engine, or the mechanical vibrations associated with normal battery operation in an automobile. On the other hand, an excessive heat build-up produces an undesired lead expulsion or "blowout" of the weld.

The heat energy build-up during the welding step is dependent upon such factors as the area of contact between the mating portions of the lugs, the amount of pressure applied at the contact area and the amount of electrical energy applied to the lugs. Typically, the proper operating conditions for the welding apparatus to produce the proper energy build-up, hence the desired weld quality for any particular battery type and/or connector lug configuration, are established by trial and error approach. Sample welds are made, then some of the welded connections are cross-sectioned and inspected for the degree of fusion and others are destructively tested to determine the structural integrity of the weld. The operating conditions of the welding apparatus are adjusted until a welded connection meeting the predetermined criteria are obtained. After this initial equipment set-up procedure, which can be very time consuming and laborious, an attempt is made to maintain these operating conditions throughout production.

Any variations in the operating conditions of the welding apparatus during production, such as changes in the electrical current and squeezing pressure, and in the dimensions of the connector lugs and/or the partition or casing wall thicknesses, has a direct effect on the degree of fusion between the connector lugs. Ordinarily, recurring lead expulsions resulting from an excessive heat build-up can be readily observed by a visual inspection of the completed connection and the appropriate adjustments made to the welding equipment. However, a "cold weld" connection resulting from an insufficient heat build-up can go undetected with a consequential production of a quantity of batteries vulnerable to the in-use failures described above. In fact, "cold weld" connections can frequently pass initial tensile strength and electrical resistance tests to which the completed assemblies are commonly subjected during production. With prior art constructions, either destructive tests or very expensive and complicated analytical techniques, such as X-ray examinations, are required to detect these marginal "cold welds."

In view of these difficulties, it is readily apparent that the provision of an external indication of the degree of internal fusion between the mating projections of the connector lugs not only will reduce time and labor required for the welding equipment set-up, but will also provide the capability for a continuous monitoring of the quality of the completed assemblies without destructive testing.

SUMMARY OF THE INVENTION

The principal object of this invention is to provide an improved electrical connection for a storage battery and a method for making same wherein an indication of the quality of the welded connection can be determined without destructive testing.

Another object of this invention is to provide such a connector having an external indication of the degree of fusion between the connecting portions of the connector lugs.

A further object of this invention is to provide such a connection which permits a simplified set-up of the welding equipment for obtaining a predetermined quality for the welded connection.

Other objects and advantages of this invention will become apparent to those skilled in the art from the following description, drawing and appended claims.

According to this invention, connector lugs positioned on opposite sides of an intercell partition or the casing wall are connected together through an aperture in the partition or casing wall by heat fusion, either by heat fusing together the two connector lugs which are in mating engagement, by heat fusing the two connector lugs to opposite ends of a separate connector pin positioned in the aperature, or by heat fusing one connector lug to a projection extending through the aperture from the other connector lug. At least one of the connector lugs, preferably the lug connected to the negative plates, is provided with an orifice extending laterally from the exterior surface of the lug to be in communication with the juncture at which the fused connection is made. During the welding step, a small amount of molten lug or connector pin material is extruded out through this orifice. The orifice is arranged so that the amount of material extruded therethrough is a direct indication of the degree of fusion at the welded connection.

BRIEF DESCRIPTION OF THE DRAWING

FIG. 1 is a fragmentary, side elevation view of a completely assembled storage battery with part of the casing broken away to show the internal construction of an intercell connection made in accordance with the present invention.

FIG. 2 is a fragmentary side elevation view showing the parts before the intercell connection is made.

FIG. 3 is a fragmentary side elevation view showing the parts after the intercell connection has been made with a proper heat build-up during the welding step.

FIG. 4 is the same view as FIG. 3 showing the completed connection with an inadequate heat build-up during the welding step.

FIG. 5 is a perspective view of a welding electrode pad adapted to make the intercell connection of this invention.

DESCRIPTION OF THE PREFERRED EMBODIMENT

FIG. 1 shows a battery 10 comprising a casing 12 having a pllurality of partition walls 14 molded integrally with the casing 12 to form cell chambers 16. A battery element 18, including positive and negative plates alternately arranged with suitable separators, is mounted in each cell chamber. Straps 20 and 22 connect plates of opposite polarity, e.g., strap 20 is cast to all the negative plates in one cell and strap 22 is cast to all the positive plates of the adajcent cell. The elements in the end cell chamber are provided with terminal posts 24 (only one shown) which extend upwardly through the battery cover 26' for an external electrical connection.

As shown in FIGS. 1 and 2, straps 20 and 22 (other than those having a terminal post 24 thereon) are provided with an upstanding connector lug 28 having projections 30 and 32 extending horizontally from sealing surface 34. The straps, connector lugs and projections are preferably made from lead with or without small quantities of alloying ingredients such as antimony, arsenic, etc. The connector lugs and projections are preferably cast integrally with straps 20 and 22 although the connector lugs can be burned onto the straps in a separate step if desired. The straps are connected to the plates of the elements in any conventional manner, preferably cast to the plates, such as by the method described in U.S. Pat. 3,087,005.

As shown in FIG. 2, connector lug 28 and projection 30 are provided with a tapered opening 26 extending laterally therethrough. Opening 26 provides an outlet through which molten material extrudes during the welding operation as described hereinafter. Both projections 30 and 32 can have similar openings; however, the opening is preferably provided in the lug attached to the negative plates in order to minimize the possibilities of corrosion generally associated with connector lugs attached to the positive plates. Elements 18 are installed in cell chambers 16 by suitable means with projections 30 and 32 connector lugs 28 aligned with apertures 38 in partition wall 14. Aperture 38 is made of the desired configuration by any suitable means, such as by drilling or punching, prior to the installation of the elements into the container. The apertures are preferably free of any burrs or other particles which could interfere with and prevent a fluid tight seal at the partition.

After installation and proper positioning of the elements, projections 30 and 32 are positioned within aperture 38 as shown in FIG. 2 and the parts are ready for the welding step. It should be understood that the connector lugs can take many configurations and that FIG. 2 merely depicts one preferred configuration. Exemplary examples of other acceptable configurations for the projections are described in U.S. Pats. 3,313,658 and 3,275,793, which are incorporated herein by reference thereto.

The method of making the intercell connection, including the three steps of squeezing, welding and holding, is generally disclosed in U.S. Pat. 3,313,658 and for the purposes of completeness, the disclosure of that patent is incorporated herein by reference thereto. The projections 30 and 32 are squeezed together within aperture 38 by any suitable means such as by a pair of power actuated jaws as shown in FIG. 2. Generally, a pressure of about 900 lbs. p.s.i. is applied to the connector lugs by jaws 40 for about 20 to about 49 cycles (1 cycle=⅟₆₀ second). The nose 42 of projection 32 is forced into engagement with depression 44 of projection 30 during this step. Welding current is then aplied to projections 30 and 32 through welding electrodes 46a, 46b attached to jaws 40.

Projections 30 and 32 are configured to provide a relatively small initial contact area when mated during the squeezing step. This causes a high initial electrical resistance when the welding current is applied, thereby generating heat energy which softens the lead projections. As shown in FIG. 3, the projections fuse and flow together under pressure, completely filling aperture 38. During this welding step a small amount of molten metal from projection 42 is extruded out through opening 36. As the projections fuse and flow together under pressure, the area of contact increases rapidly thereby reducing the electrical resistance which, in turn, stabilizes the heat energy produced and thus prevents a "blow-out" of the weld due to excessive heat. Although the initial contact area should be relatively small in order to produce the desired heat energy build-up, projections 30 and 32 are configured with a sufficient mass to prevent excessive heat build-up and weld "blow-out" upon initial application of electrical energy. In other words, the volume of material in projection 30 in the vicinity surrounding the internal portion of opening 36 contacting nose 42, at the time of initial electrical energy application, should be sufficient to dissipate the initial heat energy without a weld "blow-out".

Opening 36 is configured so that, when the proper amount of energy is generated to effect the desired fused joint between projections 30 and 32, molten material completely fills openings 36 and a small tit-like protuberance 48, which acts as an external weld quality indicator as explained below, is formed on the outside surface of connector lug 28. The size and configuration of opening 36 necessary to obtain the proper formation of protuberance 48 is dependent upon many factors, such as the composition and configuration of projections 30 and 32, the amount of pressure applied to lugs 28 by weld jaws 40, etc. For any particular intercell connector construction, the optimum size and configuration of opening 36 can be determined by a minimum of routine tests. A few sample welds are made with the connector lugs having openings of various sizes and configurations at the same weld current and pressure for each connection. The welding connections are then dissected and inspected to determine which size and shape of opening 36 provided the best completed fused joint. After this determination is made, opening 36 in all the intercell connector lugs of that particular construction are provided with the same size and shape.

It can be readily appreciated that opening 36 must be large enough so that molten material will be extruded therethrough at a pressure resulting from a heat energy build-up below a point where a "blow-out" occurs. Conversely, opening 36 must be small enough so that the molten material will not extrude therethrough until a sufficient pressure resulting from a heat energy build-up required to provide a completely fused joint between projections 30 and 32 is produced. As a guide, we have found that, for an intercell connector having projections made from a conventional lead-antimony alloy configured as shown in FIG. 2 with aperture 38 having a diameter of approximately 0.375 inch, the thickness of partition 14 being about 0.120 inch, the radius of hemispherical nose 42 being about 0.2 inch and opening 36 having a taper of about 20 degrees, the diameter of opening 36 at the outside surface of lug 28 should be from about 1/32 to about 1/16 inch.

FIG. 2 shows opening 36 as being tapered; however, it should be understood that it can be of any convenient configuration so long as molten material is extruded therethrough at the level of welding current and pressure which provides a desired fused joint between projections 30 and 32. A tapered opening is generally more convenient to cast into the connector lug, and therefore, is the preferred configuration.

When a connector pin is positioned in the partition aperture between the connector lugs, as illustrated in FIG. 16 of U.S. Pat. 3,313,658, openings similar to opening 36 are provided in both connector lugs. One connector lug can have a projection extending through the partition aperture into a recess provided in the other connector lug. When this connector lug arrangement is used, an opening similar to opening 36 is provided in the latter connector lug.

FIG. 3 shows a properly fused connection between projections 30 and 32 with an external indication thereof, i.e., protuberance 48. FIG. 4 shows the same intercell connector having an opening 36 of the same size and shape but where an insufficient heat energy build-up was produced during the welding operation, and therefore, an insufficient extrusion of molten material through opening 36. The resulting "cold weld" can be readily detected because of the absence of protuberance 48 and necessary action can be taken to adjust the welding equipment to obtain the proper weld.

In FIGS. 3 and 4, a joint is shown between the material extruded through opening 36 and lug 28 and also between the two lugs 28 for the purposes of illustration. It should be understood that in actual practice projections 30 and 32 are fused together so that there are so discernible joints, except under microscopic examination.

As shown in FIGS. 2 and 5, one weld electrode pad 46a, preferably the one corresponding to the negative connector lug, is provided with a cavity 50 to accommodate the extrusion of protuberance 48 and passage 52 which vents cavity 50 to the atmosphere. Without vent passage 52, a gas pressure will build up in cavity 50 and the extrusion of protuberance 48 is inhibited; thus, higher heat energy build-up is required to extrude protuberance 48 with a resultant increase in the probability of a weld expulsion. If there is an excessive heat energy build-up during the welding step, the material will be extruded into vent passage 52 thereby forming a discernible ridge on the outside surface of lug 28 upon cooling. As with insufficient extrusion of molten material, corrective action can be taken by adjusting the welding equipment to obtain the proper weld.

Generally, during the welding step, electrical energy of 6-volt A.C. averaging about 10,000 amps is applied to the lugs for about 20 to 25 cycles. Upon completion of the weld step, the pressure is maintained by jaws 40 on the lugs 28 for about 30 to 45 cycles and the weld area is cooled to produce a sound fused connection between projections 30 and 32. Cooling is accomplished by any suitable means, such as by circulating water or other medium through jaws 40.

The completed connection provides a double seal between projection cell chamber 16. By virtue of the pressure applied to lugs 28 during the welding step, faces 34 on lugs 28 are forced into and held in sealing engagement with opposite sides of partition walls 14 upon completion of the weld.

A second seal is produced between the fused projections and the walls of aperture 38. Projections 30 and 32 are designed so that the total volume thereof is slightly greater than the total volume of aperture 38 in partition 14 and opening 36.

Welded intercell connections were made on several automotive storage batteries utilizing intercell connectors with this invention. Opening 36 was the same size and configuration for all of the connectors. The welding equipment was operated at approximately 5,000 amps and 5 volts, approximately 610 p.s.i. jaw pressure with a squeeze time of about 60 cycles, a weld time of about 25 cycles and a hold time of about 60 cycles. Tests were performed on the completed connections to determine the quality of the welded joint. The connections were first subjected to a 150 lb. tensile force and then subjected to a torque test. All of the connections passed the tensile test. During the torque test, 35 of the connections failed at 60 in.-lb., or higher, 2 connections failed at 45 in.-lb. and 2 connections failed at 40 in.-lb. Upon further inspection, the first 35 connections were found to be properly fused together whereas the latter 4 connections were produced by a "cold weld," i.e., incomplete fusion between the connector lug projections. All of the first 35 connections had an external protuberance similar to that shown in FIG. 3. The other 4 connections had an incomplete extrusion of material through opening 36 similar to the condition illustrated in FIG. 4.

From the results of these tests, it can be seen that this invention provides a simple and reliable means for an external indication of the quality of the internal weld for a heat fused intercell connector. A properly formed external protuberance 48 is an indication that there has been an adequate amount of heat generated during the weld step, and hence, a completely fused joint rather than a "cold weld." Conversely, the absence of a protuberance 48 indicates the likelihood of a "cold weld." The existence or absence of protuberance 48, which indicates the quality of the internal weld, can be monitored visually or automatically by electrical sensing means, such as by limit switches. Batteries having "cold weld" connections can be removed from the production line and such connections rewelded to insure an adequate fuse connection for operational use. Also, recurring "cold welds," as indicated by the absence of protuberance 48, can be corrected by making the appropriate adjustments to the welding equipment.

This invention also permits minimum welding equipment setup time. The welding equipment is merely adjusted until a proper protuberance 48 is formed and is then ready for production without destructive testing heretofore employed as described above.

In addition to use with an intercell connection as described in detail above, this invention is adaptable to battery constructions where external terminals are connected to the elements in the end cells through an aperture in one of the outer walls of the battery casing instead of extending through the cover. U.S. Patent 3,303,056 discloses an exemplary external construction of this type to which this invention is adaptable. For the purposes of brevity and completeness of disclosure, the disclosure of that patent is incorporated herein by reference thereto. When this invention is used with such a terminal construction, opening 36 is preferably located in the lug positioned on the outside of the casing wall.

Although the preferred embodiment of this invention has been illustrated and described in detail, it will be apparent to those skilled in the art that various changes and modifications can be made thereto without departing from the spirit and scope of the invention.

We claim:

1. A connector for electrically connecting battery elements of a storage battery through an aperture in a wall of the battery casing comprising:
   (a) a first upstanding connector lug electrically connected to the plates of one polarity of a first element;
   (b) a second upstanding connector lug electrically connected to the plates of the opposite plurality of a second element positioned in an adjoining cell;
   (c) said connector lugs being electrically connected through said aperture via a connecting means positioned in said aperture, said connecting means being united with said connector lugs by at least one heat fused point; and
   (d) at least one of said connector lugs prior to heat fusion having a passage extending substantially horizontally therethrough from the interior surface of forming said fused joint to the outer surface of said connector lug, said passage being completely filled and a protuberance formed at and extending from the outer surface of said connector lug with material from said connecting means extruded through said passage during the heat fusion of said joint, said protuberance being an external indication of a proper weld.

2. The connector according to claim 1 wherein said wall is a partition separating said cells.

3. The connector according to claim 1 wherein said wall is an outer wall of said casing and one of said connector lugs, positioned against the outside surface of said outer wall, is electrically connected to an external terminal means rather than another element.

4. The connector according to claim 2 wherein said connecting means comprises projections formed integrally with and extending horizontally from each of said connector lugs, said projections being heat fused together.

5. The connector according to claim 3 wherein said passage is located in said connector lug positioned against the outside surface of said outer wall.

6. The connector according to claim 4 wherein said passage is located in the connector lug electrically connected to the negative plates.

7. The connector according to claim 6 wherein the combined volume of said projections is slightly larger than the total volume of said aperture and said passage prior to heat fusion.

8. The connector according to claim 7 wherein said projections prior to heat fusion have an interfitting hemispherical and a conical depression thereon.

9. The connector according to claim 8 wherein the projection of the connector lug attached to the negative plates prior to heat fusion has a conical depression and the projection of the connector lug attached to the positive plates is hemispherically shaped.

10. The connector according to claim 9 wherein the cross section of said passage converges toward the outer surface of said connector lug.

11. A method for making a sealed low-resistance electrical connection through an aperture in a wall of a storage battery comprising:
   (a) providing upstanding connector lugs on opposite sides of said wall and metal connecting means positioned in said aperture, said connecting means having at least one juncture in contact with said connector lugs;
   (b) providing a passage extending horizontally through at least one of said connector lugs from said juncture to the outer surface of said connector lug;
   (c) passing electrical energy through said connecting means to generate sufficient heat to melt at least a portion thereof; and
   (d) extruding molten material from said connecting means through said passage, said passage being arranged to become completely filled with said molten material and a small protuberance formed on the outer surface of said connector lug once sufficient heat energy is generated to substantially eliminate voids as said juncture.

12. The method according to claim 11 wherein said connecting means is provided by projections formed integrally with and extending horizontally from each of said connector lugs and said juncture is effected between said projections.

13. The method according to claim 12 wherein the combined volume of said projections is slightly greater than the total volume of said aperture and said passage.

14. A method for making a multicell storage battery comprising:
   (a) providing an open top battery case having at least one partition dividing said case into at least two separate cell compartments, said partition having an aperture therethrough;
   (b) providing battery elements comprising a plurality of positive and negative plates, said elements including connector straps thereon electrically connecting plates of one polarity and said connector lug straps each having an upstanding connector lug thereon;
   (c) providing said connector lugs with projections formed integrally therewith and extending horizontally therefrom;
   (d) providing one of said connector lugs with a passage extending horizontally therethrough;
   (e) positioning said battery elements into each of said cell compartments with said projections in contact with each other through said aperture;
   (f) passing an electrical welding current through said projections to melt at least a portion thereof;
   (g) compressing said connector lugs transversely of said partitions to establish sealing engagement between said connector lugs and said partition and between said projections and the periphery of said aperture;
   (h) extruding molten material from the projections or through said passage, said passage being arranged to become completely filled with said molten material and a small protuberance formed on the outer surface of said connector lug having said passage when sufficient heat is generated to substantially eliminate voids at the juncture between said projections; and
   (i) maintaining said connector lugs under compression for a period of time sufficient to allow said molten material to harden to a point where said projections interconnect said connector lugs and said sealing engagements are maintained.

15. The method according to claim 14 wherein the combined volume of said projections is slightly greater than the total volume of said aperture and said passage.

References Cited

UNITED STATES PATENTS

| | | | |
|---|---|---|---|
| 3,313,658 | 4/1967 | Sabatino et al. | 136—134 R |
| 3,303,056 | 2/1967 | Sabatino et al. | 136—135 S |
| 3,336,164 | 8/1967 | Miller | 136—134 R |

DONALD L. WALTON, Primary Examiner

U.S. Cl. X.R.

136—176

UNITED STATES PATENT OFFICE
CERTIFICATE OF CORRECTION

Patent No.  3,687,734                    Dated   August 29, 1972

Inventor(s) Daniel Orlando; George Paul Smith

It is certified that error appears in the above-identified patent and that said Letters Patent are hereby corrected as shown below:

Column 2, line 55, "Anoher" should be --Another--

Column 3, line 35, "pllurality" should be --plurality--

Column 3, line 61, "26" should be --36--

Column 3, line 62, "26" should be --36--

Column 4, line 24, "aplied" should be --applied--

Column 5, line 48, "so"(last so) should be --no--

Column 6, line 18, "25" should be --24--

Column 7, line 14, "point" should be --joint--

Signed and sealed this 22nd day of May 1973.

(SEAL)
Attest:

EDWARD M. FLETCHER, JR.            ROBERT GOTTSCHALK
Attesting Officer                  Commissioner of Patents